(12) United States Patent (10) Patent No.: US 9,208,021 B2
Liang (45) Date of Patent: Dec. 8, 2015

(54) DATA WRITING METHOD, MEMORY STORAGE DEVICE, AND MEMORY CONTROLLER

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 329 days.

(21) Appl. No.: 13/939,191

(22) Filed: Jul. 11, 2013

(65) Prior Publication Data

US 2014/0337681 A1 Nov. 13, 2014

(30) Foreign Application Priority Data

May 13, 2013 (TW) .............................. 102116923 A

(51) Int. Cl.
*H03M 13/00* (2006.01)
*G06F 11/10* (2006.01)
(52) U.S. Cl.
CPC .................................. *G06F 11/1044* (2013.01)
(58) Field of Classification Search
CPC ............ H03M 13/2957; H03M 13/29; H03M 13/1515; H03M 13/2909; G11B 20/1833
USPC ......................................................... 714/755
See application file for complete search history.

(56) References Cited

U.S. PATENT DOCUMENTS

2004/0013210 A1* 1/2004 Bollano .............. G06F 17/5045
375/341
2010/0313099 A1 12/2010 Yamaga

FOREIGN PATENT DOCUMENTS

TW 201216292 4/2012

OTHER PUBLICATIONS

"Office Action for Taiwan Counterpart Application," issued on Sep. 23, 2015, p1-p8, in which the listed references were cited.

* cited by examiner

*Primary Examiner* — Albert Decady
*Assistant Examiner* — Enam Ahmed
(74) *Attorney, Agent, or Firm* — Jianq Chyun IP Office

(57) ABSTRACT

A data writing method, a memory storage device, and a memory controller for controlling a rewritable non-volatile memory module are provided. The rewritable non-volatile memory module includes at least one memory chip, and each memory chip includes a plurality of physical erasing units. The data writing method includes following steps. A data is written into at least one first physical erasing unit. A first error correction code and a second error correction code are respectively generated according to the data, where a number of bits correctable to the second error correction code is greater than a number of bits correctable to the first error correction code. The second error correction code is written into a second physical erasing unit. The first physical erasing unit and the second physical erasing unit belong to the same memory chip. Thereby, the memory space can be efficiently used.

23 Claims, 8 Drawing Sheets

DATA WRITING METHOD, MEMORY STORAGE DEVICE, AND MEMORY CONTROLLER

CROSS-REFERENCE TO RELATED APPLICATION

This application claims the priority benefit of Taiwan application serial no. 102116923, filed on May 13, 2013. The entirety of the above-mentioned patent application is hereby incorporated by reference herein and made a part of this specification.

BACKGROUND

1. Technology Field

The invention generally relates to a data writing method, and more particularly, to a data writing method for a rewritable non-volatile memory module, and a memory storage device and a memory controller using the same.

2. Description of Related Art

Along with the widespread of digital cameras, cell phones, and MP3 players in recently years, the consumers' demand to storage media has increased drastically. Rewritable non-volatile memory (for example, flash memory) is one of the most adaptable storage media to aforementioned portable multimedia devices due to its many characteristics such as data non-volatility, low power consumption, small volume, and non-mechanical structure.

Generally, to ensure the security of data stored in a rewritable non-volatile memory module, the data is encoded to generate an error correction code. If an error occurs in the data, the error correction code can be used for correcting the error. A rewritable non-volatile memory module usually includes multiple memory chips, where one of the memory chips is used for storing error correction codes, while the other memory chips are used for storing data. When a memory chip for storing data is damaged, the damaged data can be recovered by using other data and the error correction codes. However, if a rewritable non-volatile memory module includes only a small number of memory chips (for example, two memory chips), a large proportion of the memory space is used for storing error correction codes. As a result, the memory space cannot be efficiently used. Thereby, how to improve the use efficiency of a memory space and enhance the security of data has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a data writing method, a memory storage device, and a memory controller, in which the use efficiency of a memory space is improved and the security of data is enhanced.

An exemplary embodiment of the invention provides a data writing method adapted to a rewritable non-volatile memory module. The rewritable non-volatile memory module includes at least one memory chip. Each memory chip includes a plurality of physical erasing units. Each physical erasing unit includes a plurality of physical programming units. The physical programming units in each physical erasing unit include a plurality of fast physical programming units and a plurality of slow physical programming units, where the write speed of the fast physical programming units is faster than the write speed of the slow physical programming units. The data writing method includes following steps. A first data is written into at least one of the fast physical programming units. A first error correction code is generated according to the first data, where the first error correction code is configured for correcting a part of the bits in a single fast physical programming unit into which at least a part of the first data is written. A second error correction code is generated according to the first data, where the second error correction code is configured for correcting the fast physical programming unit into which at least a part of the first data is written, and a number of bits correctable to the second error correction code is greater than a number of bits correctable to the first error correction code. The first error correction code and the second error correction code are written into at least one of the physical erasing units. A second data is written into at least one of the slow physical programming units. A third error correction code is generated according to the second data, where the third error correction code is configured for correcting a part of the bits in a single slow physical programming unit into which at least a part of the second data is written. A fourth error correction code is generated according to the second data, where the fourth error correction code is configured for correcting at least one of the slow physical programming units into which the second data is written, and a number of bits correctable to the fourth error correction code is greater than a number of bits correctable to the third error correction code. The third error correction code and the fourth error correction code are written into at least one of the physical erasing units.

An exemplary embodiment of the invention provides a data writing method adapted to the rewritable non-volatile memory module described above. The data writing method includes following steps. A first data is written into at least one first physical erasing unit. A first error correction code is generated according to the first data, where the first error correction code is configured for correcting a part of the bits in a single physical programming unit into which at least a part of the first data is written. A second error correction code is generated according to the first data, where the second error correction code is configured for correcting the physical programming unit into which at least a part of the first data is written, and a number of bits correctable to the second error correction code is greater than a number of bits correctable to the first error correction code. The second error correction code is written into a second physical erasing unit, where the first physical erasing unit and the second physical erasing unit belong to the same memory chip.

An exemplary embodiment of the invention provides a memory storage device. The memory storage device includes a connector, the rewritable non-volatile memory module described above, and a memory controller. The connector is configured to couple to a host system. The memory controller is coupled to the connector and the rewritable non-volatile memory module. The memory controller writes a first data into at least one first physical erasing unit and generates a first error correction code according to the first data. The first error correction code is configured for correcting a part of the bits in a single physical programming unit into which at least a part of the first data is written. The memory controller also generates a second error correction code according to the first data. The second error correction code is configured for correcting the physical programming unit into which at least a part of the first data is written, and a number of bits correctable to the second error correction code is greater than a number of bits correctable to the first error correction code. The memory controller further writes the second error correction code into a second physical erasing unit, where the first physical erasing unit and the second physical erasing unit belong to the same memory chip.

An exemplary embodiment of the invention provides a memory controller for controlling the rewritable non-volatile memory module described above. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit writes a first data into at least one first physical erasing unit and generates a first error correction code according to the first data. The first error correction code is configured for correcting a part of the bits in a single physical programming unit into which at least a part of the first data is written. The memory management circuit also generates a second error correction code according to the first data. The second error correction code is configured for correcting the physical programming unit into which at least a part of the first data is written, and a number of bits correctable to the second error correction code is greater than a number of bits correctable to the first error correction code. The memory management circuit further writes the second error correction code into a second physical erasing unit, where the first physical erasing unit and the second physical erasing unit belong to the same memory chip.

As described above, exemplary embodiments of the invention provide a data writing method, a memory storage device, and a memory controller, in which a data and a corresponding error correction code are stored in the same memory chip to improve the use efficiency of the memory space. On the other hand, two data is respectively written into fast physical programming units and slow physical programming units to enhance the security of the data.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
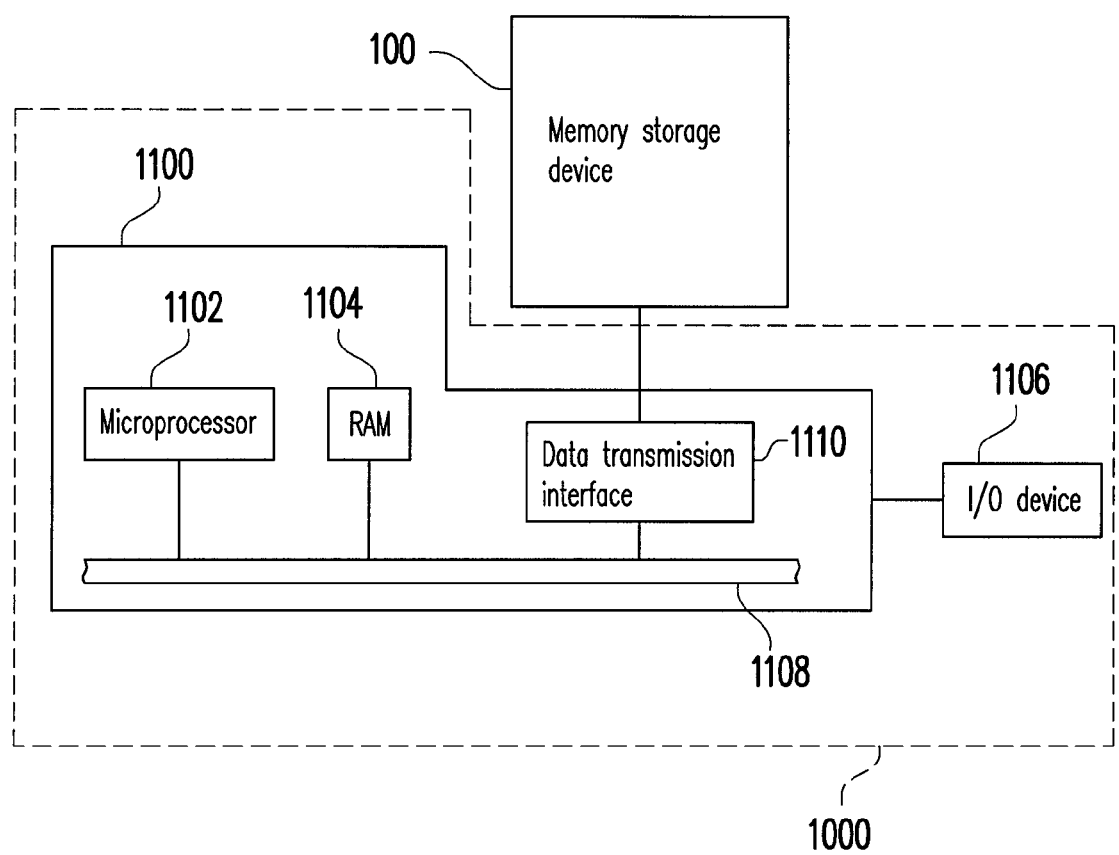
FIG. 1A illustrates a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a rewritable non-volatile memory module and a controller (also referred to as a control circuit). The memory storage device is usually used along with a host system so that the host system can write data into or read data from the memory storage device.

FIG. 1A illustrates a host system and a memory storage device according to an exemplary embodiment of the invention.

Figure 1B:
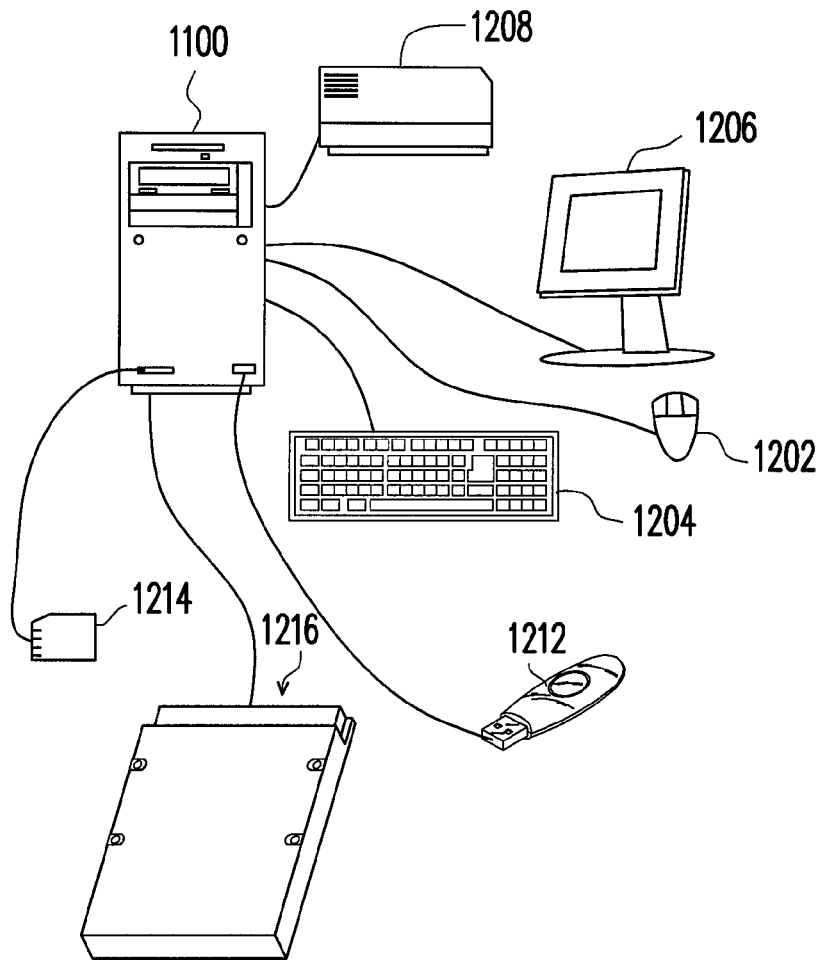
FIG. 1B is a diagram of a computer, an input/output (I/O) device, and a memory storage device according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, a memory storage device 100 is coupled to other components of the host system 1000 through the data transmission interface 1110. Data can be written into or read from the memory storage device 100 through the operations of the microprocessor 1102, the RAM 1104, and the I/O device 1106. The memory storage device 100 is a rewritable non-volatile memory storage device, such as a flash drive 1212, a memory card 1214, or a solid state drive (SSD) 1216 illustrated in FIG. 1B.

Figure 1C:
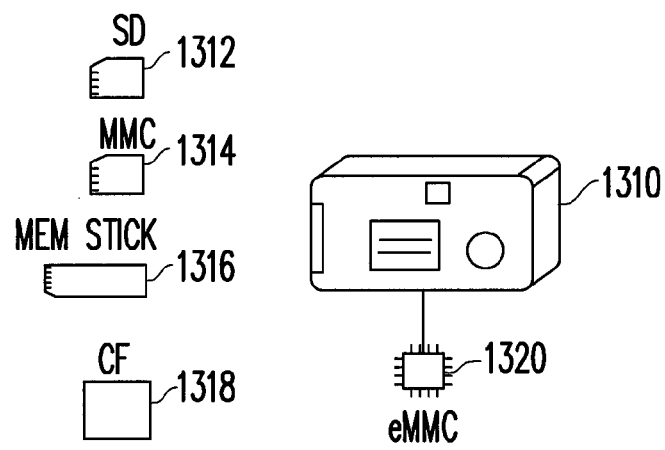
FIG. 1C is a diagram of a host system and a memory storage device according to an exemplary embodiment of the invention.

Generally speaking, the host system 1000 can be substantially any system that works with the memory storage device 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2:
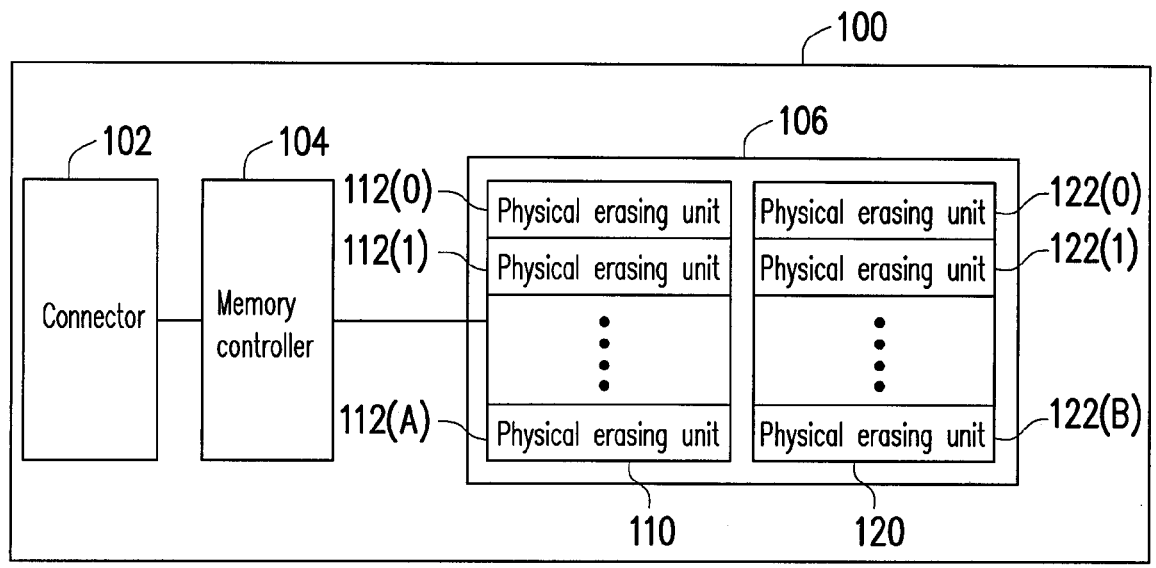
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the SD interface standard, the ultra high speed-I (UHS-I) interface standard, the ultra high speed-II (UHS-II) interface standard, the MS interface standard, the MMC interface standard, the eMMC interface standard, the universal flash storage (UFS) interface standard, the CF interface standard, the integrated device electronics (IDE) standard, or any other suitable standard.

The memory controller 104 executes a plurality of logic gates or control instructions implemented in a hardware form or a firmware form and performs data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has a memory chip 110 and a memory chip 120. The memory chip 110 includes physical erasing units 112(0)-112(A), and the memory chip 120 includes physical erasing units 122(0)-122(B). The memory chip 110 and the memory chip 120 work independently. Namely, at the same time when data reading, writing, or erasing operations are performed on the memory chip 110, data reading, writing, or erasing operations can also be performed on the memory chip 120, and the operations performed on the memory chip 110 can be different from the operations performed on the memory chip 120. The physical erasing units 112(0)-112(A) may belong to the same memory die or different memory dies, and the physical erasing units 122(0)-122(B) may also belong to the same memory die or different memory dies. In the present exemplary embodiment, the rewritable non-volatile memory module 106 includes two memory chips. However, the invention is not limited thereto, and in other exemplary embodiments, the rewritable non-volatile memory module 106 may also include more or fewer memory chips.

Each physical erasing unit has a plurality of physical programming unit sets, and each physical programming unit set includes one or more physical programming units. The physical programming units of the same physical erasing unit can be individually written but have to be erased all together. Each physical erasing unit may be composed of 128 physical programming units. However, the invention is not limited thereto, and each physical erasing unit may also be composed of 64, 256, or any other number of physical programming units. To be specific, physical erasing unit is the smallest unit for erasing data. Namely, each physical erasing unit contains the least number of memory cells that are erased all together. Physical programming unit is the smallest unit for programming data. Namely, physical programming unit is the smallest unit for writing data.

Each physical programming unit usually includes a data bit area and a redundant bit area. The data bit area includes a plurality of physical access addresses for storing user data, and the redundant bit area is used for storing an error checking and correcting (ECC) code of the physical programming unit. When an error occurs in a physical programming unit (i.e., an error occurs in the data stored in the data bit area), the ECC code in the redundant bit area is used for correcting the physical programming unit. In the present exemplary embodiment, the data bit area of each physical programming unit contains 4 physical access addresses, and the size of each physical access address is 512 bytes (B). However, in other exemplary embodiments, a data bit area may also contain 8, 16, or any different number of physical access addresses. The size and number of the physical access addresses are not limited in the invention. The physical erasing units may be physical blocks, and the physical programming units may be physical pages or physical sectors.

In the present exemplary embodiment, the rewritable non-volatile memory module 106 is a multi level cell (MLC) NAND flash memory module. Namely, each memory cell can store at least two data bits, and each physical programming unit set includes two physical programming units. To be specific, a plurality of memory cells on a same word line form a physical programming unit set, and the two bits in each memory cell respectively belong to different physical programming units. With such a structure, the two physical programming units in a physical programming unit set can be categorized into a fast physical programming unit and a slow physical programming unit. In other words, the physical programming units in a physical erasing unit include a plurality of fast physical programming units and a plurality of slow physical programming units. Generally speaking, the write speed of the fast physical programming units is greater than the write speed of the slow physical programming units, and in the same physical programming unit set, the fast physical programming units have to be programmed before the slow physical programming units are programmed. However, the rewritable non-volatile memory module 106 may also be a single level cell (SLC) NAND flash memory module, a trinary level cell (TLC) NAND flash memory module, any other flash memory module, or any other memory module having the same characteristics. When the rewritable non-volatile memory module 106 is a TLC NAND flash memory module, a physical programming unit set includes three physical programming units, and these three physical programming units are categorized into a fast physical programming unit and two slow physical programming units. Generally speaking, the fast physical programming unit has to be programmed before the slow physical programming units are programmed.

Figure 3:
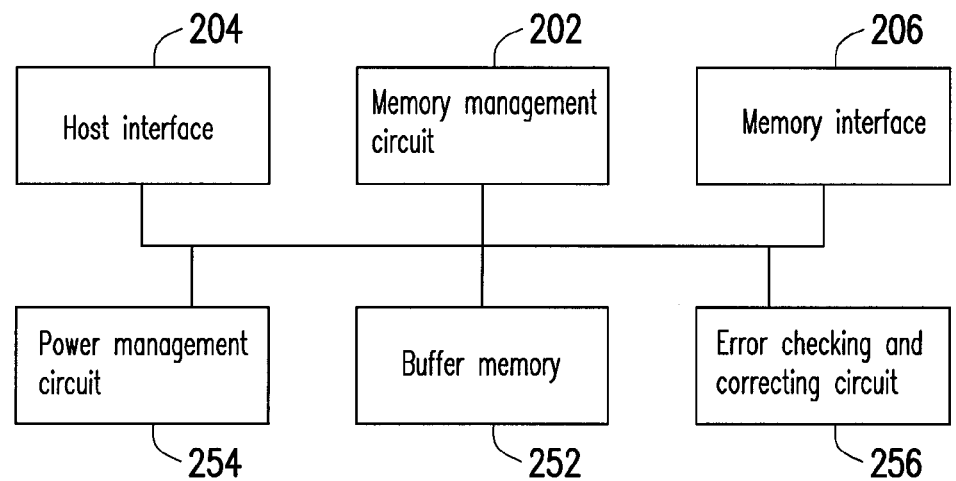
FIG. 3 is a schematic block diagram of a memory controller according to an exemplary embodiment of the invention.

FIG. 3 is a schematic block diagram of a memory controller according to an exemplary embodiment of the invention.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage device 100 is in operation, the control instructions are executed to perform various data writing, data reading, and data erasing operations. Below, the operation of the memory management circuit 202 will be described, and the operation of the memory controller 104 can be referred to the description related to the operation of the memory management circuit 202 therefore will not be described.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage device 100 is in operation, the control instructions are executed by the microprocessor unit to carry out data writing, data reading, and data erasing operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a boot code. When the memory controller 104 is enabled, the microprocessor unit first executes the boot code to load the control instructions from the rewritable non-volatile memory module 106 into the RAM of the memory management circuit 202. After that, the microprocessor unit runs the control instructions to perform various data writing, reading, and erasing operations.

In yet another exemplary embodiment of the invention, the control instructions of the memory management circuit 202 may also be implemented in a hardware form. For example, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage the physical erasing units of the rewritable non-volatile memory module 106. The memory writing unit is configured to issue a write command to the rewritable non-volatile memory module 106 to write data into the rewritable non-volatile memory module 106. The memory reading unit is configured to issue a read command to the rewritable non-volatile memory module 106 to read data from the rewritable non-volatile memory module 106. The memory erasing unit is configured to issue an erase command to the rewritable non-volatile memory module 106 to erase data from the rewritable non-volatile memory module 106. The data processing unit is configured to process data to be written into and read from the rewritable non-volatile memory module 106.

The host interface 204 is coupled to the memory management circuit 202 and configured to receive and identify commands and data from the host system 1000. Namely, commands and data transmitted by the host system 1000 are sent to the memory management circuit 202 through the host interface 204. In the present exemplary embodiment, the host interface 204 complies with the SATA standard. However, the invention is not limited thereto, and the host interface 204 may also comply with the PATA standard, the IEEE 1394 standard, the PCI express standard, the USB standard, the SD standard, the UHS-I standard, the UHS-II standard, the MS standard, the MMC standard, the eMMC standard, the UFS standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. To be specific, when the memory management circuit 202 receives a write command from the host system 1000, the ECC circuit 256 generates a corresponding ECC code for the data corresponding to the write command. The memory management circuit 202 writes the data corresponding to the write command into the data bit area of a physical programming unit and writes the corresponding ECC code into the redundant bit area of the same physical programming unit. Subsequently, when the memory management circuit 202 reads the data from the rewritable non-volatile memory module 106, it also reads the ECC code corresponding to the data, and the ECC circuit 256 performs the ECC procedure on the data according to the ECC code.

In the present exemplary embodiment, the memory management circuit 202 writes a first data into one or more physical erasing units. After that, the memory management circuit 202 generates a first error correction code according to the first data. The first error correction code is configured for correcting some bits in a single physical programming unit into which at least a part of the first data is written. Besides, the memory management circuit 202 generates a second error correction code according to the first data. The second error correction code is used for correcting one or more physical programming units into which at least a part of the first data is written. The number of bits correctable to the second error correction code is greater than the number of bits correctable to the first error correction code. For example, the first error correction code is stored in a redundant bit area and can only be used for correcting some bits of the data stored in the data bit area of a single physical programming unit. The second error correction code can be used for correcting data in two or more physical programming units or all the bits in at least one physical programming unit. The second error correction code is also written into a physical erasing unit. Particularly, the second error correction code and the first data are written into the same memory chip. In the present exemplary embodiment, the first error correction code or the second error correction code is generated by the memory management circuit 202. However, the invention is not limited thereto, and the first error correction code or the second error correction code may also be generated by the ECC circuit 256.

The first error correction code and the second error correction code may be parity checking codes, channel coding, or any other type of codes. For example, an error correction code generated by the memory management circuit 202 may be a hamming code, a low density parity check (LDPC) code, a turbo code, or a Reed-solomon (RS) code. However, the invention is not limited thereto. If the ratio of the length of a data to the length of an error correction code is m:n, m physical programming units containing the data are corresponding to n physical programming units containing the error correction code, where m and n are positive integers. Generally speaking, the positive integer m is greater than the positive integer n. However, the invention is not limited thereto. Besides, the values of the positive integer m and the positive integer n are not limited in the invention either.

FIG. 4A, FIG. 4B, FIG. 5, and FIG. 6 are diagrams illustrating how error correction codes are written according to an exemplary embodiment of the invention.

Figure 4A:
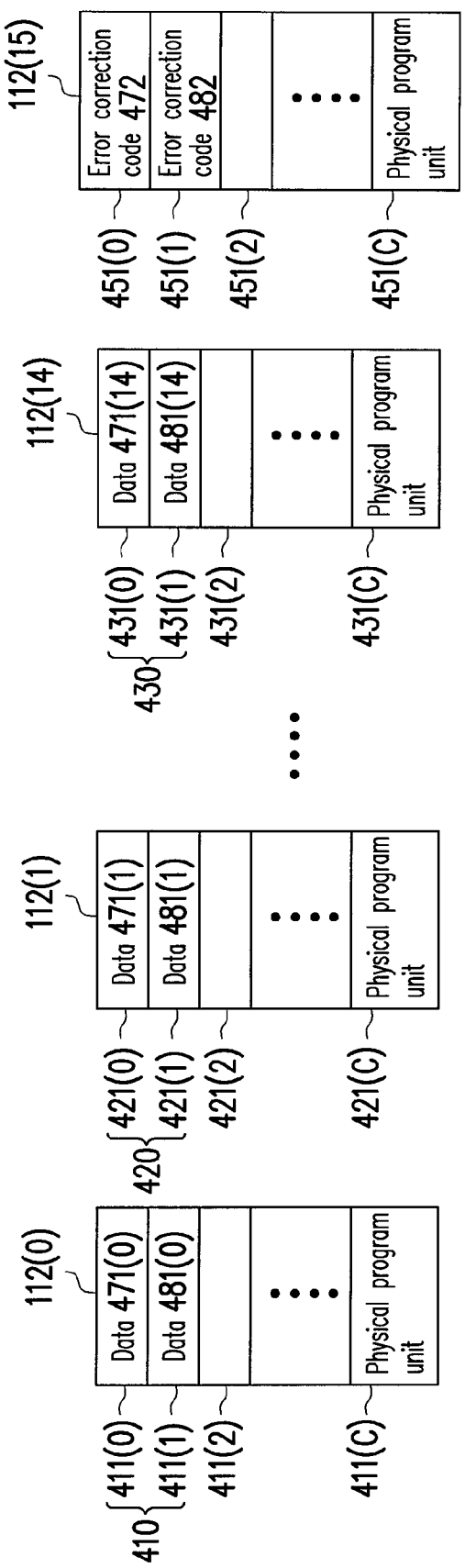
FIG. 4A, FIG. 4B, FIG. 5, and FIG. 6 are diagrams illustrating how error correction codes are written according to an exemplary embodiment of the invention.

Referring to FIG. 4A, the physical erasing unit 112(0) includes physical programming units 411(0)-411(C). In FIG. 4A, the fast physical programming units and the slow physical programming units are alternatively illustrated. Namely, the physical programming unit 411(0) is a fast physical programming unit, the physical. programming unit 411(1) is a slow physical programming unit, the physical programming units 411(0) and 411(1) form a physical programming unit set 410, and so on. The physical erasing unit 112(1) includes physical programming units 421(0)-421(C). The physical programming unit 421(0) is a fast physical programming unit, the physical programming unit 421(1) is a slow physical programming unit, and the physical programming units 421(0) and 421(1) form a physical programming unit set 420. The physical erasing unit 112(14) includes physical programming units 431(0)-431(C). The physical programming unit 431(0) is a fast physical programming unit, the physical programming unit 431(1) is a slow physical programming unit, and the physical programming units 431(0) and 431(1) form a physical programming unit set 430. In the exemplary embodiment illustrated in FIG. 4, the ratio of the length of the data to the length of the second error correction code is 15:1 (i.e., the positive integer m is 15, and the positive integer n is 1). Herein it is assumed that the memory management circuit 202 is about to write the first data into 15 physical programming units. Thus, the second error correction code generated by the memory management circuit 202 has the size of a physical programming unit. To be specific, the memory management circuit 202 writes the first data 471(0) into the physical programming unit 411(0), writes the first data 471(1) into the physical programming unit 421(0), and writes the first data 471(14) into the physical programming unit 431(0). It should be noted that to simplify the drawing, not all the 15 physical programming units for writing the first data or all the first data 471(0)-471(14) is illustrated herein. The memory management circuit 202 generates an error correction code 472 (also referred to as a second error correction code) according to the first data 471(0)-471(14) and writes the second error correction code 472 into the physical programming unit 451(0). In the present exemplary embodiment, the second error correction code 472 is a parity checking code. When an error occurs in one of the fast physical programming units containing the first data 471(0)-471(14), the memory management circuit 202 corrects the fast physical programming unit with the error according to a parity checking algorithm.

Herein the first data 471(0)-471(14) may be data received from the host system 1000, system data generated by the memory management circuit 202, or data generated in any other operation. However, the source and content of the first data 471(0)-471(14) are not limited in the invention.

Figure 4B:
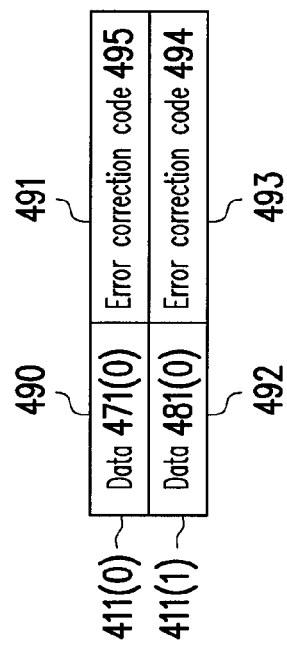

Referring to FIG. 4B, the memory management circuit 202 also generates a first error correction code according to data in a data bit area. For example, the physical programming unit 411(0) includes a data bit area 490 and a redundant bit area 491. The memory management circuit 202 generates a first error correction code 495 according to the first data 471(0) and writes the first error correction code 495 into the redundant bit area 491. In the present exemplary embodiment, the first error correction code is an ECC code. When an error occurs in the first data 471(0), the memory management circuit 202 corrects some bits of the first data 471(0) according to the first error correction code 495. It should be noted that in FIG. 4A, each of the physical programming units 421(0) and 431(0) has a redundant bit area storing a corresponding error correction code. To simplify the drawing, not every redundant bit area in the physical programming units is illustrated.

Referring to FIG. 4A, the memory management circuit 202 also writes a second data 481(0) into the physical programming unit 411(1), writes a second data 481(1) into the physical programming unit 421(1), and writes a second data 481 (14) into the physical programming unit 431(1). The memory management circuit 202 generates an error correction code 482 (also referred to as a fourth error correction code) according to the second data 481(0)-481(14) and writes the fourth error correction code 482 into the physical programming unit 451(1). Additionally, the memory management circuit 202 generates an error correction code (also referred to as a third error correction code) stored in the redundant bit area respectively according to the second data 481(0)-481(14). As shown in FIG. 4B, the physical programming unit 411(1) includes a data bit area 492 and a redundant bit area 493. The memory management circuit 202 generates a third error correction code 494 according to the second data 481(0) and writes the third error correction code 494 into the redundant bit area 493. The third error correction code 494 is used for correcting some bits in the data bit area 492. Referring to FIG. 4A again, the second data 481(1) and the second data 481(14) are respectively corresponding to a third error correction code. However, to simplify the drawing, the redundant bit areas in the physical programming units 411(1), 421(1), and 431(1) are not illustrated. In the present exemplary embodiment, the number of bits correctable to the fourth error correction code 482 is greater than the number of bits correctable to the third error correction code. For example, the third error correction code is used for correcting data in the data bit area of the same physical programming unit (i.e., the third error correction code is an ECC code). The fourth error correction code 482 is used for correcting the second data 481(0)-481(14) in one or more physical programming units. The fourth error correction code 482 may be a parity checking code. When an error occurs in one of the physical programming units storing the second data 481(0)-481(14), the memory management circuit 202 corrects the physical programming unit with the error according to a parity checking algorithm.

It should be noted that the first data 471(0)-471(14) is only written into fast physical programming units, while the second data 481(0)-481(14) is only written into slow physical programming units. Because two physical programming units in a physical programming unit set are usually damaged together, if two first data (or second data) is written into two physical programming units of the same physical programming unit set, errors may be produced in these two data at the same time, and accordingly the error correction code 472 (or 482) cannot be used for correcting the errors. However, in the present exemplary embodiment, if the physical programming unit set 410 is damaged, the error correction code 472 and 482 are respectively used for correcting errors in the physical programming units 411(0) and 411(1).

In an exemplary embodiment, before being written into the physical erasing units 112(0)-112(14), the first data 471(0)-471(14) is stored in the buffer memory 252 of the memory controller 104. Before the first data 471(0) is to be written into the physical erasing unit 112(0), the memory management circuit 202 generates a temporary second error correction code according to the first data 471(0). Next, the memory management circuit 202 writes the first data 471(0) into the physical erasing unit 112(0) and generates another temporary second error correction code according to the temporary second error correction code and the first data 471(1). Similarly, after the first data 471(1) is written, the memory management circuit 202 generates yet another temporary second error correction code according to the another temporary second error correction code and the first data 471(2), and so on. In other words, the memory management circuit 202 generates a temporary second error correction code corresponding to each first data at the same time when it writes the first data, and after all the first data 471(0)-471(14) is written, the temporary second error correction code becomes the error correction code 472. The memory management circuit 202 stores the temporary second error correction code into the buffer memory 252 or any physical erasing unit. However, the invention is not limited thereto, and in another exemplary embodiment, the memory management circuit 202 may also generate the error correction code 472 according to the first data 471(0)-471(14) at a time (for example, the error correction code 472 is generated after the first data 471(0)-471(14) is written).

In an exemplary embodiment, the first data 471(0)-471(14) is received from the host system 1000. However, the host system 1000 may write data of more or fewer than 15 physical programming units each time. In other words, the first data 471(0)-471(14) may be corresponding to one or more write commands. For example, the host system 1000 first issues a write command to write data into 13 physical programming units. After receiving the data, the memory management circuit 202 does not generate the error correction code 472 instantly. Subsequently, the host system 1000 issues another write command to write data into 8 physical programming units. The memory management circuit 202 obtains the first data 471(0)-471(14) from the data corresponding to these two write commands. For example, the memory management circuit 202 obtains the first data 471(0)-471(12) from the first write command and obtains the first data 471(13)-471(14) from the second write command. Remaining data in the second write command is combined with the data in another write command. Accordingly, the first data 471(0)-471(14) is corresponding to two write commands. However, the invention is not limited thereto, and the first data 471(0)-471(14) may also be corresponding to three or more write commands. Or, the first write command is to write data into 19 physical programming units. In this case, the memory management circuit 202 obtains the first data 471(0)-471(14) from this data, and the remaining data of 4 physical programming units is combined with other data (for example, data of 11 physical programming units in a next data). In this case, the first data 471(0)-471(14) is corresponding to one write command. Similarly, the second data 481(0)-481(14) may be corresponding to one or more write commands, which is not limited in the invention.

In an exemplary embodiment, multiple physical erasing units can be combined into a super physical unit, and the memory management circuit 202 uses the super physical unit as one physical erasing unit. For example, when a physical erasing unit in a super physical unit is to be erased, all the physical erasing units in the super physical unit are erased all together. In FIG. 4A, the physical erasing units 112(0)-112(15) belong to the same super physical unit. However, the invention is not limited thereto, and in another exemplary embodiment, the memory management circuit 202 may not set up any super physical unit, and the physical erasing units 112(0)-112(15) can be individually erased.

Figure 5:
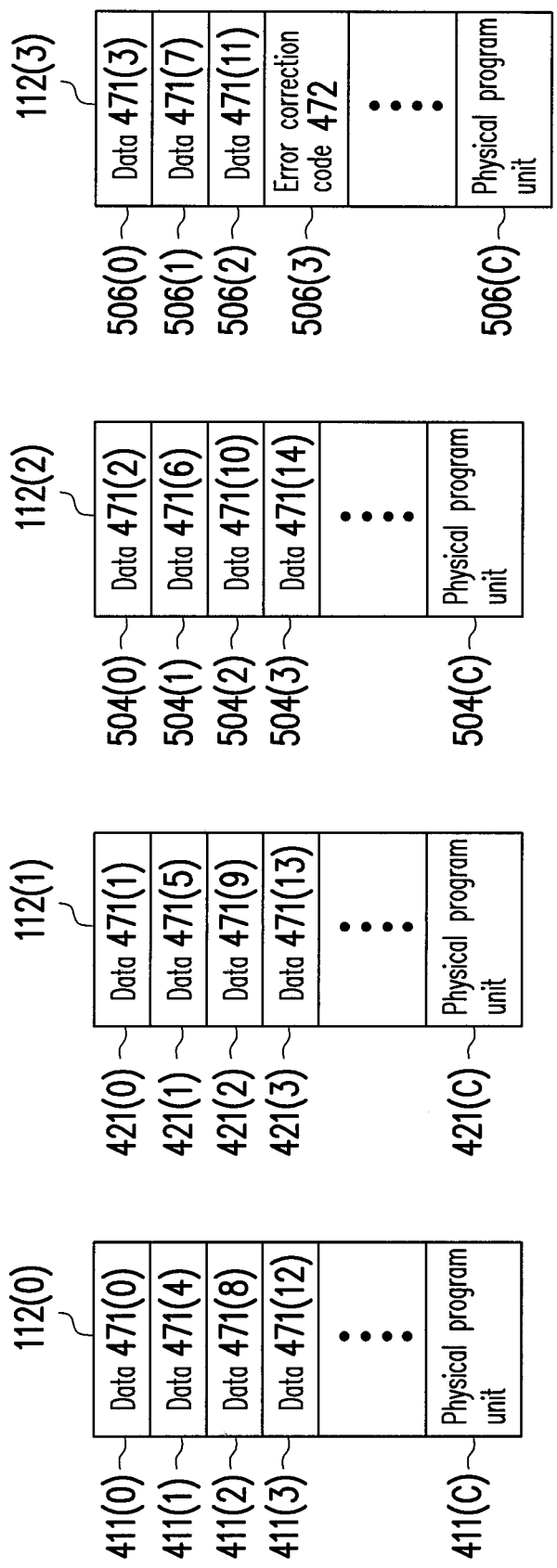

Referring to FIG. 5, in the exemplary embodiment illustrated in FIG. 5, part of the first data 471(0)-417(14) and the error correction code 472 are written into the same physical erasing unit. To be specific, the first data 471(0), 471(4), 471(8), and 471(12) is respectively written into the physical programming units 411(0)-411(3), the first data 471(1), 471(5), 471(9), and 471(13) is respectively written into the physical programming units 421(0)-421(3), the first data 471(2), 471(6), 471(10), and 471(14) is respectively written into the physical programming units 504(0)-504(3), and the first data 471(3), 471(7), and 471(11) is respectively written into the physical programming units 506(0)-506(2). The error correction code 471 is written into the physical programming unit 506(3). The physical programming units 506(0)-506(3) belong to the same physical erasing unit 112(3). In other words, the first data 471(0)-471(14) is written into the physical erasing units 112(0)-112(3), and the physical erasing unit 112(3) storing the error correction code 472 is one of the physical erasing units 112(0)-112(3). In an exemplary embodiment, the physical erasing units 112(0)-112(3) can form a super physical unit. However, the invention is not limited thereto.

Figure 6:
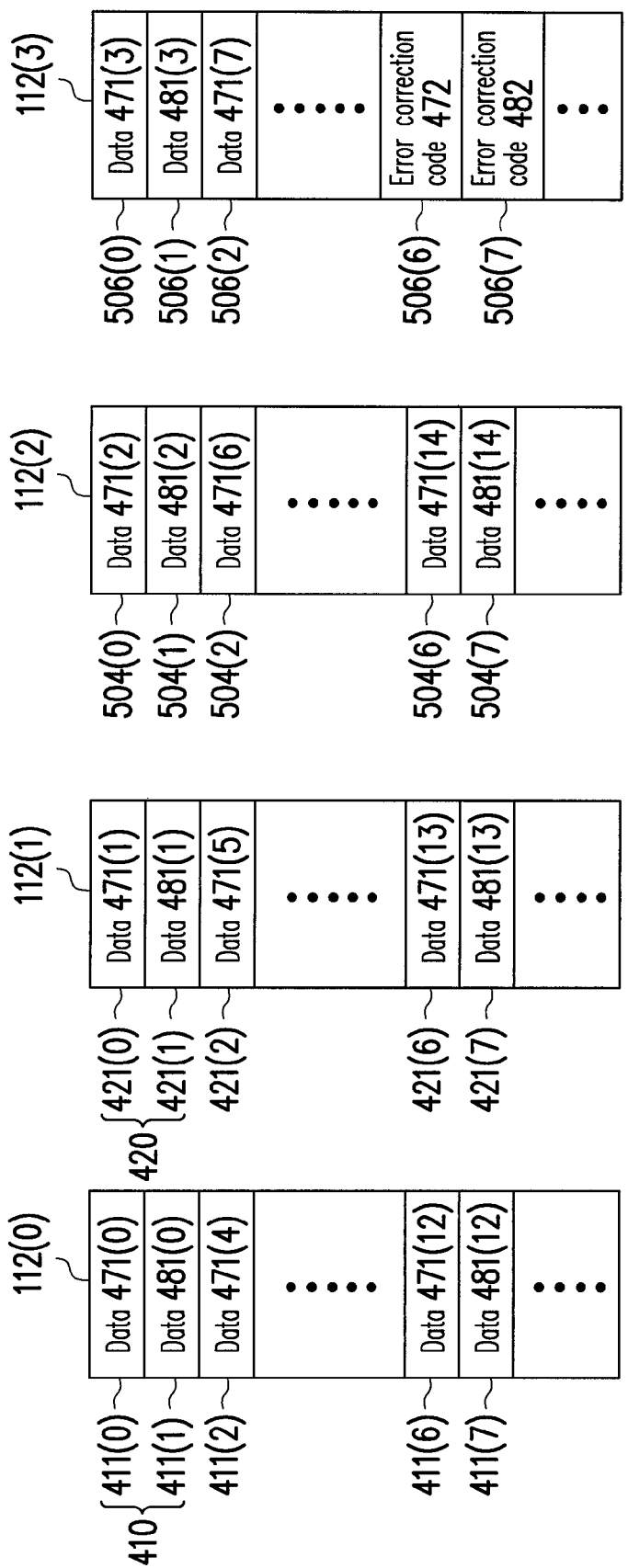

Referring to FIG. 6, in an exemplary embodiment, one of the first data 471(0)-471(14) and one of the second data 481(0)-481(14) belong to the same physical programming unit set. For example, the first 471(0) and the second data 481(0) is written into the same physical programming unit set 410, the first 471(1) and the second data 481(1) is written into the same physical programming unit set 420, and so on. In the present exemplary embodiment, the error correction code 472 and the first 471(3) and 471(7) are written into the same physical erasing unit 112(3). However, in other exemplary embodiments, the error correction code 472 may also be written into a physical erasing unit in the memory chip 110 other than the physical erasing units 112(0)-112(3). For example, the memory management circuit 202 selects a physical erasing unit from the memory chip 110, and the error correction codes 472 and 482 are both written into this physical erasing unit. Or, the error correction codes 472 and 482 are written into different physical erasing units. In the invention, whether the error correction code 472 and the first data 471(0)-471(14) are written into the same physical erasing unit or whether the error correction codes 472 and 482 are written into the same physical erasing unit are not limited.

Herein the error correction code 472 and the error correction code 482 are respectively written into the fast physical programming unit 506(6) and the slow physical programming unit 506(7) which share the same word line. However, the invention is not limited thereto, and in other exemplary embodiments, the error correction code 472 and the error correction code 482 may also be written into two physical programming units not sharing a word line.

In the present exemplary embodiment, the first data 471(0)-471(14) and the error correction code 472 are written into the same memory chip 110. However, in other exemplary embodiments, the first data 471(0)-471(14) and the error correction code 472 may also be respectively written into different memory chips. For example, the first data 471(0)-471(14) is written into the memory chip 110, while the error correction code 472 is written into the memory chip 120. Or, if the rewritable non-volatile memory module 106 includes multiple memory chips, the first data 471(0)-471(14) are scatterly written into different memory chips. However, the invention is not limited thereto.

Figure 7:
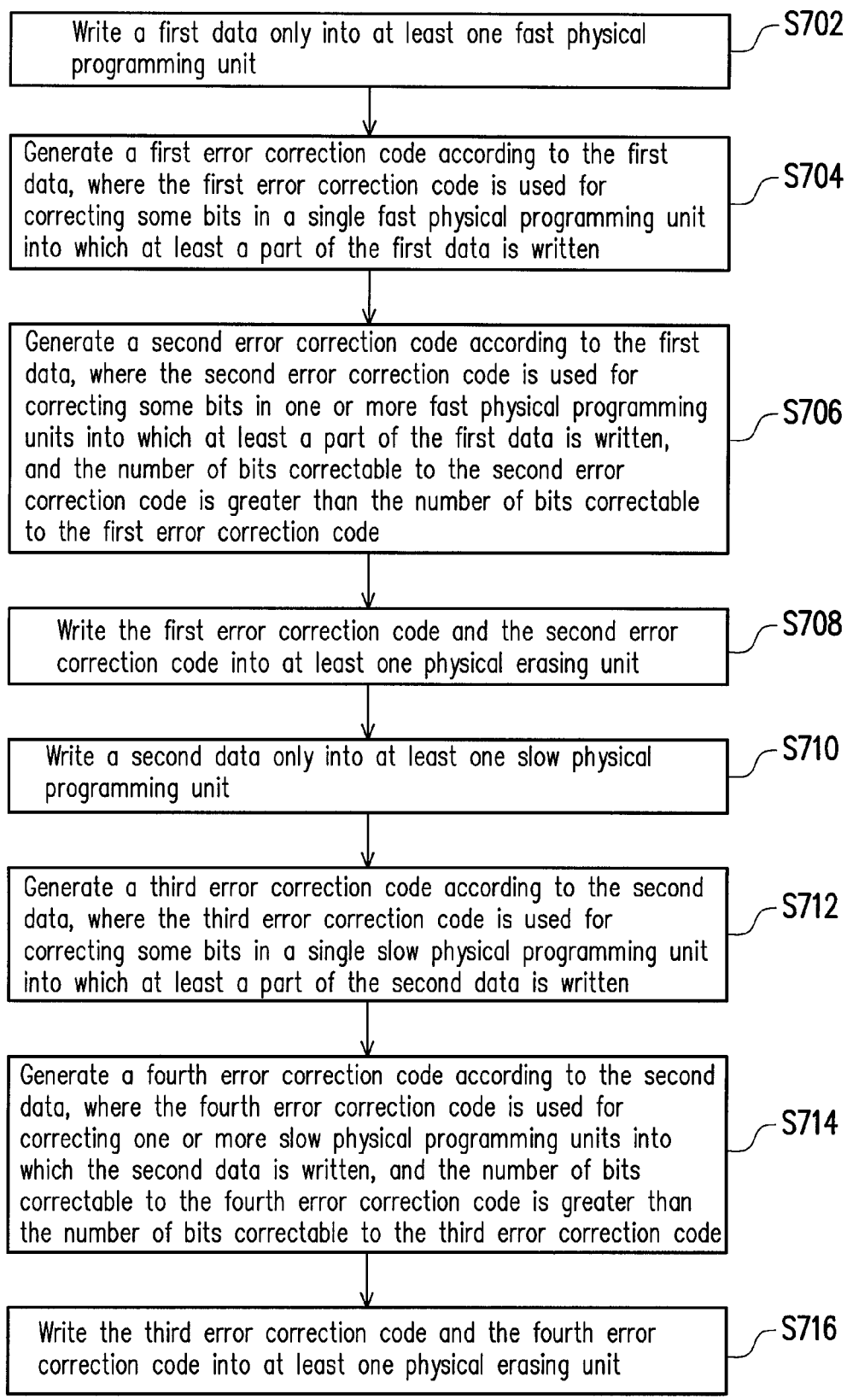
FIG. 7 and FIG. 8 are respectively a flowchart of a data writing method according to an exemplary embodiment of the invention.
Figure 8:
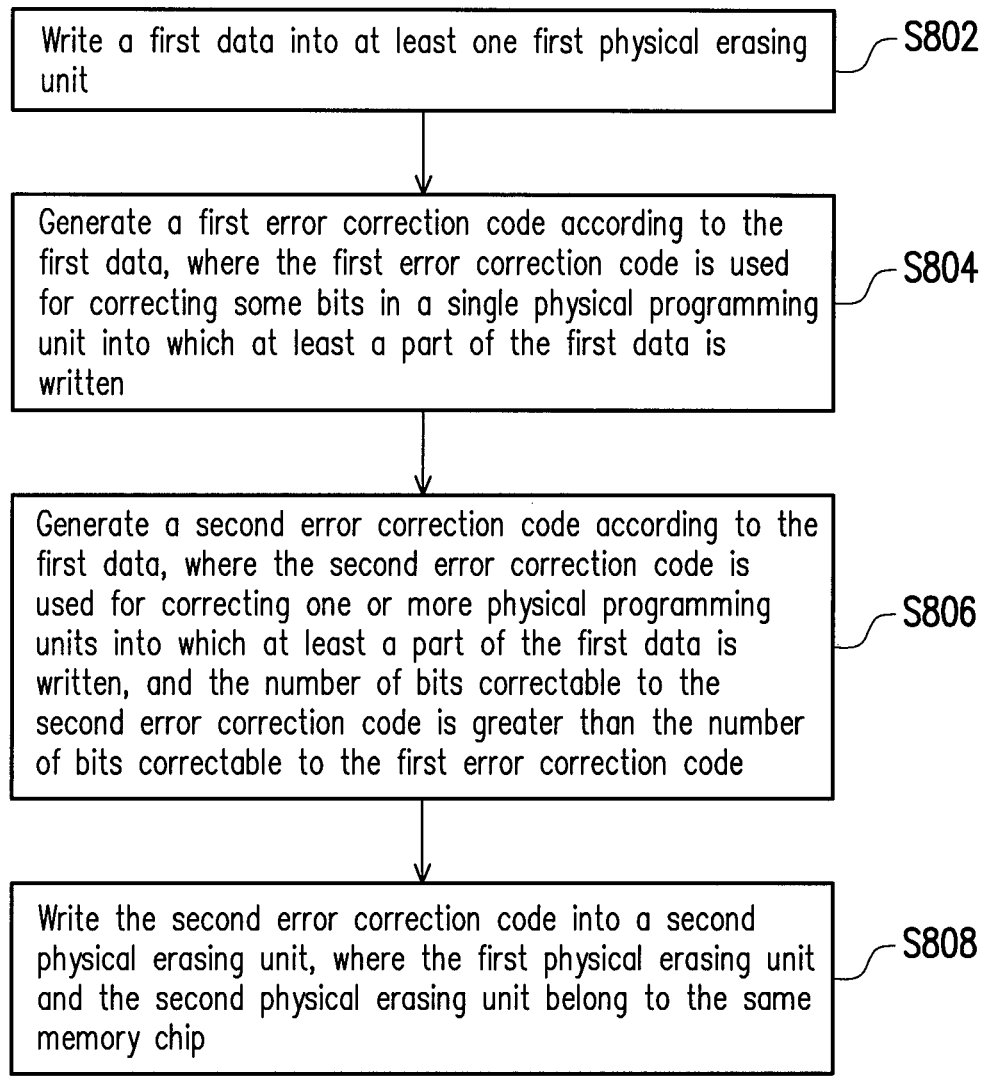

FIG. 7 and FIG. 8 are respectively a flowchart of a data writing method according to an exemplary embodiment of the invention.

Referring to FIG. 7, in step S702, a first data is written only into at least one fast physical programming unit. In step S704, a first error correction code is generated according to the first data. The first error correction code is used for correcting some bits in a single fast physical programming unit into which at least a part of the first data is written. In step S706, a second error correction code is generated according to the first data. The second error correction code is used for correcting some bits in one or more fast physical programming units into which at least a part of the first data is written, and the number of bits correctable to the second error correction code is greater than the number of bits correctable to the first error correction code. In step S708, the first error correction code and the second error correction code are written into at least one physical erasing unit. In step S710, a second data is written only into at least one slow physical programming unit. In step S712, a third error correction code is generated according to the second data. The third error correction code is used for correcting some bits in a single slow physical programming unit into which at least a part of the second data is written. In step S714, a fourth error correction code is generated according to the second data. The fourth error correction code is used for correcting one or more slow physical programming units into which the second data is written, and the number of bits correctable to the fourth error correction code is greater than the number of bits correctable to the third error correction code. In step S716, the third error correction code and the fourth error correction code are written into at least one physical erasing unit. It should be noted that in the data writing method illustrated in FIG. 7, the first data and the second error correction code are written into the same memory chip or different memory chips. Similarly, the second data and the fourth error correction code may be written into the same memory chip or different memory chips. However, the invention is not limited herein.

Referring to FIG. 8, in step S802, a first data is written into at least one first physical erasing unit. In step S804, a first error correction code is generated according to the first data. The first error correction code is used for correcting some bits in a single physical programming unit into which at least a part of the first data is written. In step S806, a second error correction code is generated according to the first data. The second error correction code is used for correcting one or more physical programming units into which at least a part of the first data is written, and the number of bits correctable to the second error correction code is greater than the number of bits correctable to the first error correction code. In step S808, the second error correction code is written into a second physical erasing unit, where the first physical erasing unit and the second physical erasing unit belong to the same memory chip. It should be noted that in the data writing method illustrated in FIG. 8, the first data can be written into fast physical programming units, slow physical programming units, or both, which is not limited in the invention.

The steps in FIG. 7 and FIG. 8 have been described in detail above therefore will not be described herein again. However, the steps in FIG. 7 and FIG. 8 can be implemented as a plurality of program codes or circuits, which is not limited in the invention. In addition, the data writing methods illustrated in FIG. 7 and FIG. 8 can be applied along with the exemplary embodiments described above or independently, which is not limited in the invention.

As described above, exemplary embodiments of the invention provide a data writing method, a memory storage device, and a memory controller, in which the use efficiency of the memory space is improved. On the other hand, multiple data corresponding to one error correction code is not written into the same physical programming unit set, so that the security of data is enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for a rewritable non-volatile memory module, wherein the rewritable non-volatile memory module comprises at least one memory chip, each of the at least one memory chip comprises a plurality of physical erasing units, each of the physical erasing units comprises a plurality of physical programming units, and the physical programming units of each of the physical erasing units comprise a plurality of fast physical programming units and a plurality of slow physical programming units, wherein a write speed of the fast physical programming units is faster than a write speed of the slow physical programming units, the data writing method comprising:

writing a first data only into at least one of the fast physical programming units;

generating a first error correction code according to the first data, wherein the first error correction code is configured for correcting a part of bits in a single one of the fast physical programming units into which at least a part of the first data is written;

generating a second error correction code according to the first data, wherein the second error correction code is configured for correcting the fast physical programming unit into which at least a part of the first data is written, and a number of bits correctable to the second error correction code is greater than a number of bits correctable to the first error correction code;

writing the first error correction code and the second error correction code into at least one of the physical erasing units;

writing a second data only into at least one of the slow physical programming units;

generating a third error correction code according to the second data, wherein the third error correction code is configured for correcting a part of bits in a single one of the slow physical programming units into which at least a part of the second data is written;

generating a fourth error correction code according to the second data, wherein the fourth error correction code is configured for correcting at least one of the slow physical programming units into which the second data is written, and a number of bits correctable to the fourth error correction code is greater than a number of bits correctable to the third error correction code; and writing the third error correction code and the fourth error correction code into at least one of the physical erasing units.

2. The data writing method according to claim 1, wherein each of the fast physical programming units and each of the slow physical programming units share a word line, and the physical erasing units, the fast physical programming units, and the slow physical programming units belong to the same memory chip.

3. The data writing method according to claim 1, wherein the first error correction code and the third error correction code are error checking and correcting (ECC) codes, each of the physical programming units comprises a data bit area and a redundant bit area, the first data and the second data is written into the data bit areas, and the first error correction code and the third error correction code are written into each of the redundant bit areas;

the second error correction code and the fourth error correction code are parity checking codes, when an error occurs in at least one of the fast physical programming units into which the first data is written, the second error correction code is configured for correcting the fast physical programming unit with the error according to a parity checking algorithm, and when an error occurs in at least one of the slow physical programming units into which the second data is written, the fourth error correction code is configured for correcting the slow physical programming unit with the error according to the parity checking algorithm.

4. The data writing method according to claim 1 further comprising:

writing the second error correction code into one of the fast physical programming units; and writing the fourth error correction code into one of the slow physical programming units.

5. The data writing method according to claim 1, wherein the second error correction code and the fourth error correction code are written into different ones of the physical erasing units respectively along with the first data and the second data.

6. A data writing method, adapted to a rewritable non-volatile memory module, wherein the rewritable non-volatile memory module comprises at least one memory chip, each of the at least one memory chip comprises a plurality of physical erasing units, and each of the physical erasing units comprises a plurality of physical programming units, the data writing method comprising:

writing a first data into at least one first physical erasing unit among the physical erasing units;

generating a first error correction code according to the first data, wherein the first error correction code is configured for correcting a part of bits in a single one of the physical programming units into which at least a part of the first data is written;

generating a second error correction code according to the first data, wherein the second error correction code is configured for correcting the physical programming unit into which at least a part of the first data is written, and a number of bits correctable to the second error correction code is greater than a number of bits correctable to the first error correction code; and writing the second error correction code into a second physical erasing unit among the physical erasing units, wherein the at least one first physical erasing unit and the second physical erasing unit belong to the same memory chip.

7. The data writing method according to claim 6, wherein the first error correction code is an error checking and correcting (ECC) code, each of the physical programming units comprises a data bit area and a redundant bit area, the first data is written into the data bit areas, and the first error correction code is written into each of the redundant bit areas;

the second error correction code is a parity checking code, and when an error occurs in at least one of the physical programming units into which the first data is written, the second error correction code is configured for correcting the physical programming unit with the error according to a parity checking algorithm.

8. The data writing method according to claim 6, wherein the second physical erasing unit is different from the at least one first physical erasing unit.

9. The data writing method according to claim 6, wherein a number of the at least one first physical erasing unit is greater than 1, and the second physical erasing unit is one of the first physical erasing units.

10. The data writing method according to claim 6, wherein the physical programming units of each of the physical erasing units comprise a plurality of fast physical programming units and a plurality of slow physical programming units, wherein a write speed of the fast physical programming units is faster than a write speed of the slow physical programming units, and the first data is written only into at least one of the fast physical programming units.

11. The data writing method according to claim 10 further comprising:

writing a second data only into at least one of the slow physical programming units, wherein each of the fast physical programming units and each of the slow physical programming units share a word line;

generating a third error correction code according to the second data, wherein the third error correction code is configured for correcting a part of bits in a single one of the slow physical programming units into which at least a part of the second data is written;

generating a fourth error correction code according to the second data, wherein the fourth error correction code is configured for correcting at least one of the slow physical programming units into which the second data is written, and a number of bits correctable to the fourth error correction code is greater than a number of bits correctable to the third error correction code; and writing the third error correction code and the fourth error correction code into one of the physical erasing units.

12. A memory storage device, comprising:

a connector, configured to couple to a host system;

a rewritable non-volatile memory module, comprising at least one memory chip, wherein each of the at least one memory chip comprises a plurality of physical erasing units, and each of the physical erasing units comprises a plurality of physical programming units; and a memory controller, coupled to the connector and the rewritable non-volatile memory module, and configured to write a first data into at least one first physical erasing unit among the physical erasing units, and generate a first error correction code according to the first data, wherein the first error correction code is configured for correcting a part of bits in a single one of the physical programming units into which at least a part of the first data is written, the memory controller is configured to generate a second error correction code according to the first data, wherein the second error correction code is configured for correcting the physical programming unit into which at least a part of the first data is written, and a number of bits correctable to the second error correction code is greater than a number of bits correctable to the first error correction code, the memory controller is configured to write the second error correction code into a second physical erasing unit among the physical erasing units, wherein the at least one first physical erasing unit and the second physical erasing unit belong to the same memory chip.

13. The memory storage device according to claim 12, wherein the first error correction code is an error checking and correcting (ECC) code, each of the physical programming units comprises a data bit area and a redundant bit area, the first data is written into the data bit areas, and the first error correction code is written into each of the redundant bit areas, wherein the second error correction code is a parity checking code, when an error occurs in at least one of the physical programming units into which the first data is written, the second error correction code is configured for correcting the physical programming unit with the error according to a parity checking algorithm.

14. The memory storage device according to claim 12, wherein the second physical erasing unit is different from the at least one first physical erasing unit.

15. The memory storage device according to claim 12, wherein a number of the at least one first physical erasing unit is greater than 1, and the second physical erasing unit is one of the first physical erasing units.

16. The memory storage device according to claim 12, wherein the physical programming units of each of the physical erasing units comprise a plurality of fast physical programming units and a plurality of slow physical programming units, wherein a write speed of the fast physical programming units is faster than a write speed of the slow physical programming units, and the first data is written into at least one of the fast physical programming units.

17. The memory storage device according to claim 16, wherein the memory controller further writes a second data into at least one of the slow physical programming units, and each of the fast physical programming units and each of the slow physical programming units share a word line, the memory controller is further configured to generate a third error correction code according to the second data, wherein the third error correction code is configured for correcting a part of bits in a single one of the slow physical programming units into which at least a part of the second data is written, the memory controller is further configured to generate a fourth error correction code according to the second data, the fourth error correction code is configured for correcting at least one of the slow physical programming units into which the second data is written, and a number of bits correctable to the fourth error correction code is greater than a number of bits correctable to the third error correction code, the memory controller is further configured to write the third error correction code and the fourth error correction code into one of the physical erasing units.

18. A memory controller, for controlling a rewritable non-volatile memory module, the memory controller comprising:

a host interface, configured to couple to a host system;

a memory interface, configured to couple to the rewritable non-volatile memory module, wherein the rewritable non-volatile memory module comprises at least one memory chip, and each of the at least one memory chip comprises a plurality of physical erasing units; and a memory management circuit, coupled to the host interface and the memory interface, and configured to write a first data into at least one first physical erasing unit among the physical erasing units, and generating a first error correction code according to the first data, wherein the first error correction code is configured for correcting a part of bits in a single one of the physical programming units into which at least a part of the first data is written, the memory controller is configured to generate a second error correction code according to the first data, wherein the second error correction code is configured for correcting the physical programming unit into which at least a part of the first data is written, and a number of bits correctable to the second error correction code is greater than a number of bits correctable to the first error correction code, the memory controller is configured to write the second error correction code into a second physical erasing unit among the physical erasing units, wherein the at least one first physical erasing unit and the second physical erasing unit belong to the same memory chip.

19. The memory controller according to claim 18, wherein the first error correction code is an error checking and correcting (ECC) code, each of the physical programming units comprises a data bit area and a redundant bit area, the first data is written into the data bit areas, and the first error correction code is written into each of the redundant bit areas, wherein the second error correction code is a parity checking code, and when an error occurs in at least one of the physical programming units into which the first data is written, the second error correction code is configured for correcting the physical programming unit with the error according to a parity checking algorithm.

20. The memory controller according to claim 18, wherein the second physical erasing unit is different from the at least one first physical erasing unit.

21. The memory controller according to claim 18, wherein a number of the at least one first physical erasing unit is greater than 1, and the second physical erasing unit is one of the first physical erasing units.

22. The memory controller according to claim 18, wherein the physical programming units of each of the physical erasing units comprises a plurality of fast physical programming units and a plurality of slow physical programming units, wherein a write speed of the fast physical programming units is faster than a write speed of the slow physical programming units, and the first data is written into at least one of the fast physical programming units.

23. The memory controller according to claim 22, wherein the memory management circuit is further configured to write a second data into at least one of the slow physical programming units, and each of the fast physical programming units and each of the slow physical programming units share a word line, the memory management circuit is further configured to generate a third error correction code according to the second data, wherein the third error correction code is configured for correcting a part of bits in a single one of the slow physical programming units into which at least a part of the second data is written, the memory management circuit is further configured to generate a fourth error correction code according to the second data, wherein the fourth error correction code is configured for correcting at least one of the slow physical programming units into which the second data is written, and a number of bits correctable to the fourth error correction code is greater than a number of bits correctable to the third error correction code, the memory management circuit is further configured to write the third error correction code and the fourth error correction code into one of the physical erasing units.

* * * * *